United States Patent
Saijo et al.

[19]

[11] Patent Number: 6,150,037
[45] Date of Patent: Nov. 21, 2000

[54] CLADDING MATERIAL

[75] Inventors: Kinji Saijo; Kazuo Yoshida; Nobuyuki Yoshimoto; Yoshihiko Isobe, all of Yamaguchi-ken, Japan

[73] Assignee: Toyo Kohan Co., LTD, Tokyo, Japan

[21] Appl. No.: 09/117,854

[22] PCT Filed: Feb. 14, 1997

[86] PCT No.: PCT/JP97/00389

§ 371 Date: Aug. 12, 1998

§ 102(e) Date: Aug. 12, 1998

[87] PCT Pub. No.: WO97/30483

PCT Pub. Date: Aug. 21, 1997

[30] Foreign Application Priority Data

Feb. 15, 1996 [JP] Japan .................................. 8-050781

[51] Int. Cl.[7] .................................................. B32B 15/01
[52] U.S. Cl. ....................... 428/615; 137/68.23; 428/138; 428/593; 428/607; 428/637; 428/652; 428/653; 428/656; 428/671; 428/676; 428/679; 428/680; 428/686
[58] Field of Search .................................. 428/615, 637, 428/652, 653, 671, 676, 656, 679, 680, 686, 607, 138, 596; 137/68.23; 429/56; 29/17.3, 904; 148/527, 529, 530, 531, 532

[56] References Cited

U.S. PATENT DOCUMENTS

| | | | |
|---|---|---|---|
| 2,203,902 | 6/1940 | Georgiev | 220/89.2 |
| 2,922,544 | 1/1960 | Hibbard et al. | 137/68.23 |
| 3,688,162 | 8/1972 | Willy et al. | 317/230 |
| 3,852,647 | 12/1974 | Ishii | 361/521 |
| 3,878,440 | 4/1975 | Ando | 361/521 |
| 4,115,629 | 9/1978 | Dey et al. | 361/521 |
| 4,245,010 | 1/1981 | Golz | 429/56 |
| 4,495,147 | 1/1985 | Fricker et al. | 137/68.23 |
| 4,550,743 | 11/1985 | McFarlane et al. | 137/68.23 |
| 4,612,739 | 9/1986 | Wilson | 137/68.23 |

FOREIGN PATENT DOCUMENTS

| | | |
|---|---|---|
| 0 068 836 | 1/1983 | European Pat. Off. . |
| 887396 | 11/1943 | France . |
| 63-020188 | 1/1988 | Japan . |
| 63-285859 | 11/1988 | Japan . |
| 5-314959 | 11/1993 | Japan . |
| 6-302486 | 10/1994 | Japan . |

*Primary Examiner*—Deborah Jones
*Assistant Examiner*—Robert R. Koehler
*Attorney, Agent, or Firm*—Browdy and Neimark

[57] ABSTRACT

Clad material comprises a metal substrate which is provided with a multiplicity of perforated openings therein and a metal foil which is laminated on the metal substrate to close the perforated openings. To produce such a clad material, at least one surface of the metal substrate and corresponding one surface of the metal foil are respectively subjected to a dry etching and the metal substrate and the metal foil are laminated in such a manner that the etched surfaces face each other. Alternately, only one surface of the metal substrate is subjected to a dry etching and the metal substrate and the metal foil are laminated in such a manner that the etched surface of the metal substrate defines a laminating surface. It may be possible to provide a nickel plating on the metal substrate or the metal foil. The clad material can be effectively used for producing safety valve chips which rupture accurately at low pressures which fall in a stable pressure range on a mass production basis.

6 Claims, 2 Drawing Sheets

CLADDING MATERIAL

BACKGROUND OF INVENTION

1. Field of the Invention

The present invention relates to a clad material comprising a metal substrate having a multiplicity of perforated openings laminated with a metal foil.

2. Description of Related Art

Conventionally, batteries which use alkaline metal such as lithium, sodium or potassium as an active material on negative electrode thereof sometimes suffer from rupture when the pressure in the batteries is abnormally elevated. To prevent the occurrence of such a rupture, safety valves which can release the pressure outside in the case that the pressure in the battery is excessively increased have been requested and accordingly various safety valves having different mechanisms have been proposed. To assure the safety that even when the battery ruptures by a chance, broken pieces or contents of the battery do not scatter outside and cause no damage on human body, the batteries must be operated at a low pressure not more than 30 $kgf/cm^2$.

The dry-cell type battery which uses alkaline metal as the active material on negative electrode thereof is further required to have a high scalability. A Japanese laid-open publication SHO 63-285859 discloses a safety valve which can release the inner pressure of such a battery outside. In this battery, a part of the wall of the battery vessel is made thin by cold compressing using a press until the thickness of the compressed part becomes half of the original thickness of the part. Accordingly, when the inner pressure is elevated and reaches a predetermined inner pressure level, the thinned wall part ruptures and the inner pressure is released outside.

To release the inner pressure at a low pressure of not more than 30 $kgf/cm^2$, the thinned wall part must be made considerably thin. Accordingly, during the press working to obtain such an extremely thin wall part, fine or minute cracks may occur, and once such cracks occur, the sealability of the vessel is spoiled. Although the thinned wall part is hardened with such a press working, the hardening does not occur uniformly. Accordingly, the release valve disclosed in Japanese laid-open publication SHO 63-285859 also suffers from a drawback that even when the thinned wall part is pressed to have a uniform thickness, the thinned wall part does not always rupture at a predetermined uniform pressure.

Furthermore, although an etching method has been proposed to make a part of the wall of the battery vessel thin, it is extremely difficult to uniformly control the thickness of the thinned wall part after etching and the thinned wall part is apt to suffer from pin holes. Accordingly, thinned wall parts of all battery vessels must be subject to a pin hole test for detecting the presence of pin holes.

In this manner, with the above-mentioned method, it is extremely difficult to provide the thinned wall part which has a uniform thickness so that especially on the condition that the safety valves are to be operated to release pressure at a low pressure of not more than 30 $kgf/cm^2$, a reliable reproductivity of the pressure releasing operation cannot be achieved.

To resolve the drawbacks of the above-mentioned methods, Japanese laid-open publication HEI 5-314959 discloses a method in which a matal plate having a perforated opening and a thin metal plate adhered with each other to produce a thinned wall part having a uniform thickness and such a method provides a valve operating pressure which is not more than 30 $kgf/cm^2$ and has a reliable reproductivity on a pressure releasing operation.

In this method, however, since the perforated metal plate and the thinned metal plate are heated in a vacuum furnace and heat-sealed with each other under pressure, the materials for these metal plates must meet a condition that they can be heat-sealed under pressure. Namely, the materials for these metal plates are restricted to same metals or metals having similar physical properties such as a melting point. In Japanese laid-open publication HEI 5-314959, stainless steel, iron, nickel and the like are proposed as preferable materials for these metal plates.

Furthermore, to heat seal these metal plates under pressure to obtain a uniform adhering strength, an oxide film formed on the surface of these metal plates must be removed by buffing or the like and then the metal plates must be heated at a high temperature of approximately 1000° C. so that the method necessitates a sophistiated operation and facilities. Furthermore, these thin metal plates are usually produced by a cold rolling so that they are subjected to hardening by working. Since the above-mentioned metal plates which are hardened by working are annealed at a high temperature during the heat sealing under pressure, the mechanical strength of these metal plates differs before and after the heat sealing operation. Accordingly, the properties of the materials before heat sealing, the heating temperature and the heating time have to be strictly controlled to make the mechanical strength (the limit strength which causes a rupture when the inner pressure is elevated) of the metal plates constant after heat sealing.

SUMMARY OF THE INVENTION

Accordingly, it is an object of the present invention to provide a clad material which is preferably used for producing safety valves which rupture precisely at a predetermined pressure in a low pressure range and which can be manufactured readily.

The clad material according to the present invention is a laminate comprising a metal substrate which is provided with a multiplicity of perforated openings and a metal foil which is stacked on the metal substrate and laminated thereto so as to close the perforated openings. At least one surface of the metal substrate having a multiplicity of perforated openings and the mating surface of the metal foil are subjected to a dry etching and the etched surfaces face each other as the contacting surfaces of the resultant laminate. In the method a plurality of perforated openings are formed in a metal plate so as to produce the metal substrate and one surface of the metal substrate is subjected to a dry etching and the metal foil is stacked on the etched surface of the metal substrate. In the clad material according to the present invention, it is preferable that the metal substrate or the metal foil is provided with a nickel plating.

DETAILED DESCRIPTION OF THE PREFERRED EMBODIMENT

The clad material according to the present invention is hereinafter explained in detail in conjunction with attached drawings.

Figure 1:
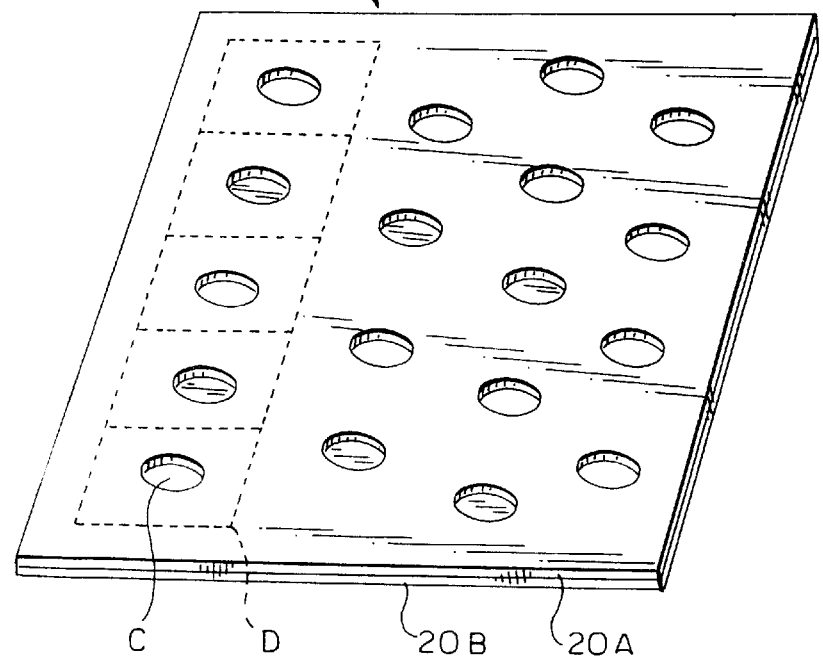
FIG. 1 is a schematic perspective view of a clad material according to the present invention.

In FIG. 1, a clad material 19 according to the present invention has a laminar sheet-like construction and is made of a metal substrate 20A and a metal foil 20B which is laminated on the metal substrate 20A. The metal substrate 20A is provided with a multiplicity of perforated openings C. A plurality of safety valve chips D can be readily produced from the clad material 19 as described hereinafter.

Figure 4:
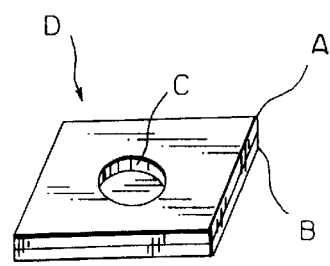
FIG. 4 is a schematic view of a safety valve chip produced from the clad material according to the present invention.

The safety valve chips D shown in FIG. 4 which are produced from the clad material 19 should be operated at a low pressure of not more than 30 kgf/cm$^2$, or preferably, of not more than 20 kgf/cm$^2$. To achieve this objective, the metal foil 20B which can be employed for the present invention should have a thickness of 5 to 50 μm corresponding to the kind of metal of the metal foil 20B. In the case that the thickness of the metal foil 20B is less than 5 μm, if the safety valve chip D is mounted on the battery as the safety valve, the metal foil 20B readily ruptures when it is dropped on a working table or the like. In the case that the thickness of the metal foil 20B exceeds 50 μm, even when the metal foil 20B is made of a metal having a low rupture strength, if the safety valve chip D is mounted on the battery as the safety valve, the metal foil 20B does not rupture at a pressure below 30 kgf/cm$^2$ and ruptures when a high pressure far exceeding 30 kgf/cm$^2$ is applied to the metal foil 20B. In such a case, as the vessel itself ruptures when the inner pressure thereof is elevated, broken pieces of the vessel are scattered around and the content in the vessel is also spilled outside thus causing a damage on a human body. Furthermore, the use of such safety valve chips D having thick metal foil 20B is not favorable in terms of the manufacturing cost of the batteries.

In the case that the metal foil 20B is used as the safety valve chip D of the battery, the kinds of metal foil 20B should preferably be steel foil, stainles steel foil, copper foil, aluminum foil, nickel foil and nickel-iron alloy foil since the metal foil 20B is required to have a favorable corrosion resistance against alkaline aqueous solution of electrolyte.

In the case that the metal foil 20B is used for usages other than batteries, any kinds of metal foil B can be used on the condition that the metal foil 20B shows a stability against a content filled in a vessel, is not corroded and does not gererate a considerable amount of a reaction gas. Namely,the metal foil 20B can be made of zinc, lead, copper alloys such brass, bronze, phosphor bronze, gun metal or monel metal, and aluminum alloy such as duralmin besides the materials as mentioned previously.

Although the metal foil 20B can be produced in any known methods, the metal foil 20B is generally produced by thinning a strip by a cold rolling or by further annealing the thus cold rolled strip.

Although the thickness of metal sheet used for producing metal substrate A is not specifically limited, it should be 0.03 to 0.50 mm usually and preferably 0.05 to 0.10 mm in view of the strength of the metal substrate 20A, an economy of production and for facilitating the welding or calking of the safety valve chip D to the vessel.

In the safety valve chip D which is made of two metal pieces, namely, the metal foil 20B and the metal substrate 20A, if the metal substrate 20A directly comes into contact with alkaline aqueous solution of electrolyte, the kinds of metal substrate 20A should preferably be steel plate, stainless steel plate, copper plate, nickel plate and nickel-iron alloy plate since the metal substrate 20A must have a favorable corrosion resistance against alkaline aqueous solution of electrolyte.

In case that the metal substrate 20A does not directly come into contact with alkaline aqueous solution, since the metal substrate 20A does not have to have a favorable resistacnce against alkaline aqueous solution, any metal plate can be used on the condition that the metal plate is stable against a content filled in a vessel, the performance of the battery is not deteriorated, and a reaction gas is not generated in a considerable amount.

The object of the present invention can be achieved even when the kind of metal foil 20B is different from the kind of the metal substrates 20A.

Furthermore, although the above-mentioned metal substrate 20A can be produced by any methods, generally, the metal plate which is thinned by the cold rolling is directly used as the metal substrate 20A or the metal plate which is produced by further annealing the thinned metal plate after the cold rolling.

The metal substrate 20A is provided with at least one perforated opening C. The size and shape of the perforated opening C differ corresponding to the size and shape of the vessel on which the safety valve chip D is mounted. Accordingly, there is no restriction on the size and shape of the perforated opening C. In general, the perforated opening C should preferably be of a circular shape having a diameter of 1 to 10 mm. The perforated opening C can be of an elliptical shape having a longitudinal axis length of 1 to 10 mm or of a polygonal shape having a diagonal length which corresponds to the diameter of the above-mentioned circular shape.

The shape of the perforated opening C can be defined by a section of a line such as a straight or curved slit having a desired width.

The shape of the perforated opening C can be defined by a geometrical pattern which is a combination of several kinds of above-mentioned figures.

These perforated openings C are formed in the metal substrate 20A in a desired shape by a punching press, wherein the metal substrate 20A is produced by thinning the plates by cold rolling as described previously. These perforated openings C are preferably arranged in a geometrical manner such as a lattice-like manner or a zigzaging manner. The pitch or interval between the perforated openings C is determined in a desired manner in view of the size of the safety valve chip D. Although the manner of forming such perforated openings C is not restricted specifically, the perforated openings C can be formed in conventional manners such as punching out the metal substrate 20A with a punching press or an etching method.

Furthermore, the clad material may be produced by adhering the metal foils 20B on both sides of the metal substrate 20A. In this case, even when one metal foil 20B adhered on one surface of the metal substrate 20A is broken, so long as the other metal foil 20B adhered to the other surface of the metal substrate 20A is not broken, the normal function of the safety valve can be assured.

Figure 5:
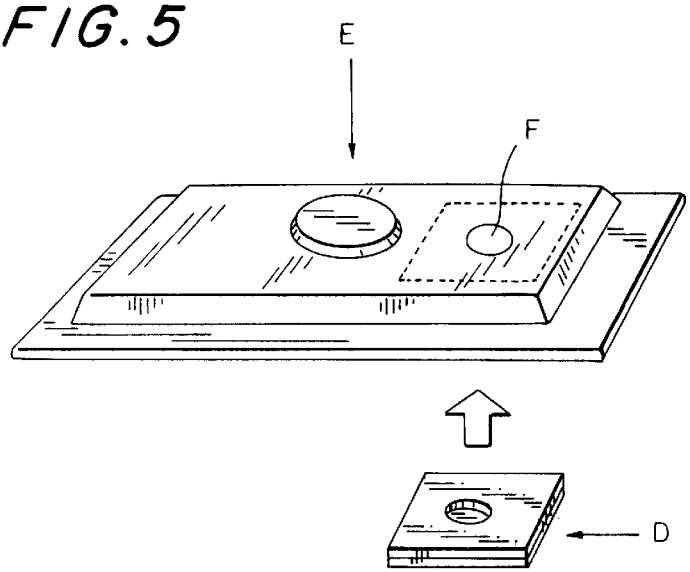
FIG. 5 is a schematic view of a lid of a vessel on which the safety valve chip is mounted.

The safety valve chip D is generally mounted on the vessel of the battery by welding in such a manner that the safety valve chip D closes an opening which is formed in a part of the vessel of the battery. For example, as shown in FIG. 5, an opening F formed in a lid E of the vessel of the battery is closed by the safety valve chip D.

The perforated opening C is formed in the metal plate to produce the metal substrate 20A and the metal foil 20B is adhered to the metal substrate 20A to produce the safety valve chip D and such a safety valve chip D can be directly molded into a lid of the vessel of a battery.

The metal foil 20B and the metal substrate 20A provided with perforated openings C are subjected to a pressure welding in a vacuum, for example, by a method disclosed in Japanese laid-open patent publication HEI 1-224184.

Figure 2:
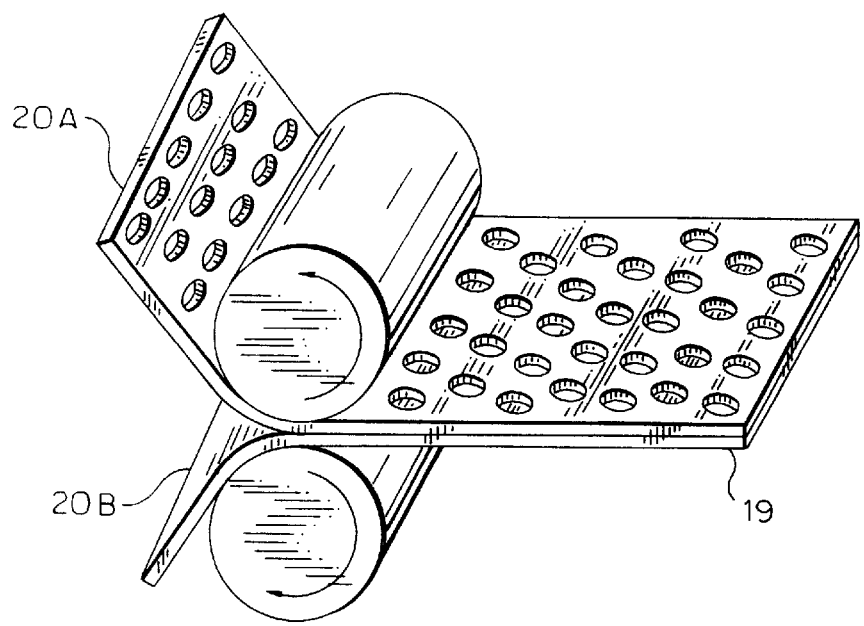
FIG. 2 is a schematic perspective view showing the manner of producing the clad material according to the present invention.
Figure 3:
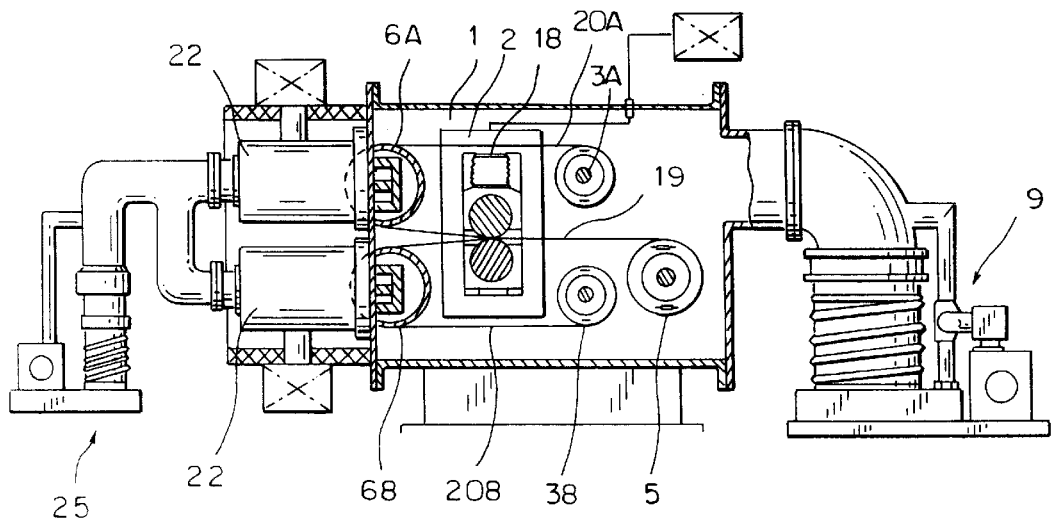
FIG. 3 is a schematic perspective view showing the apparatus for producing the clad material according to the present invention.

In FIG. 2 and FIG. 3, an apparatus for producing the clad material 19 by pressure welding a metal foil 20B and a metal substrate 20A in a vacuum is shown in a partial cross section. As shown in these drawings, the metal substrate 20A and the metal foil 20B which are respectively released from uncoilers 3A, 3B are wound around a pair of electrode rolls 6A, 6B which have portions thereof protruding toward an etching chamber 22 and then they are subjected to a sputtering treatment so as to be activated. Subsequently, the metal substrate 20A and the metal foil 20B are subjected to a cold rolling by a rolling unit 2 mounted in the vacuum chamber 1 thus producing the clad material 19 and then the clad material 19 is wound around a coiler 5. The rolling unit 2 is provided with a rolling reduction device 18 for descending the roll. The vacuum level in the vacuum chamber 1 is held in a range of $10^{-3}$ to $10^{-6}$ Torr by a large-sized vacuum pump (air exhaust pump) 9.

In the production of the clad material 19, a magnetron sputtering method is employed for activating the metal foil 20B and the metal substrate 20A and a high frequency power source having a frequency range of 1 to 50 MHz is employed as a power source for sputtering. In the case that the frequency is less than 1 MHz, it is difficult for the high frequency power source to assure a stable glow discharge so that a continuous etching is not achieved, while in the case that the frequency is more than 50 MHz, the high frequency power source apts to oscillate so that the power supply system becomes unpreferably complicated.

For starting the etching operation, preliminarily, the vacuum level in the etching chamber 22 has to be held at a pressure not more than $1\times10^{-4}$ Torr and argon gas is charged into the etching chamber 22 so as to produce an argon gas atmosphere with a vacuum level of $10^{-1}$ to $10^{-4}$ Torr. Then, a high frequency current is supplied between the etching chamber 22 and the vacuum chamber 1, plasma is generated and the surface of the metal foil 20B and the surface of the metal substrate 20A are both subjected to etching.

In the case that the presssure of argon gas is below $1\times10^{-4}$ Torr, it is difficult to assure the stable glow discharge and a high ion flow is not obtained so that a high speed etching becomes difficult. On the other hand, in the case that the pressure of argon gas exceeds $1\times10^{-1}$ Torr, the average free path of the sputtered atoms becomes short so that the freqeuncy that the sputtered atoms are shot again to the target is increased. Namely, oxygens which are separated from the oxide formed on the surfaces of the metal foil and the metal substrate by etching are again shot to the target so that the efficiency of surface activating treatment is deteriorated. Accordingly, the pressure of argon gas atmosphere in the etching chamber 22 should be held in a range of $10^{-1}$ to $10^{-4}$ Torr.

With the use the magnetron sputtering method in the production of clad material 19 of the present invention, an etching speed of more than 1000 angstrom/min can be obtained so that even when a stable and thick oxide film is formed on the aluminum and titan, such an oxide film can be completely removed in a few minutes. The oxide film formed on the surface of copper, steel, stainless steel and amorphous metal can exhibit a clean surface by etching for a few seconds.

Although the lowering of vacuum level in the vacuum chamber 1 leads to the corresponding lowering of the welding strength of the metal foil 20B to the metal substrate 20A, an allowable lower limit of the vacuum level in the vacuum chamber 1 should be $1\times10^{-1}$ Torr in view of industrial economy, while the upper limit should be $1\times10^{-3}$ Torr since this level of vacuum still assures a sufficient welding strength.

Furtheremore, in the production of the clad material 19, it is unnecessary to heat the metal foil 20B and the metal substrate 20A during a cold rolling. Namely, in the cold rolling, there is no problem even if the temperature T of these metals 20A, 20B at the time of gripping them between rolls is held at a room temperature. However, if it becomes necessary to heat the metal foil 20B and the metal substrate 20A during the cold rolling in view of decreasing the difference of the thermal expansion rates of these metals 20A, 20B caused by a heat generated at the time of rolling as well as accompanying deformation of these metals 20A, 20B after being cooled, the upper limit of heating should preferably be not more than 300° C. so as to prevent the occurrence of recrystallizing annealing, an alloy layer or carbide which deteriorate the welding strength between these metals 20A and 20B.

The rolling reduction rate at the time of cold rolling the metal foil 20B and the metal substrate 20A should preferably be 0.1 to 30% . Namely, cold rolling shoud be carried out with the rolling reduction rate which falls in a range expressed as follows.

$$0.1 \leq R \leq 30$$

wherein, $R = (T1 + T2 - TA)\times 100/(T1 + T2)$ (%)

$T1$ : thickness of metal foil before pressure welding $T2$ : thickness of metal substrate before pressure welding $TA$ : thickness of clad material after cold rolling $R$ : rolling reduction rate (%)

The lower limit of the rolling reduction rate is determined by following factors. Namely, although the surface of the plate appears flat at a glance, there are many fine or minute irregularities or indentations in a microscopic level and metals come into cotact with each other with an extremely insufficient contact area if pressure is not applied to them and under a conventional cold rolling welding method, a strong welding cannot be obtained even if the surfaces of these metals are sufficiently activated. Accordingly, in the conventional cold rolling welding method, the oxide film on the surfaces of these metals are subjected to a plastic flow by a cold rolling with a high rolling reduction rate so that the surfaces of the metals are partially activated and the contact area is increased and then the metals are welded each other. In such a method, the surfaces of the metals are not necessarily flat. Namely, the metal substrate is preliminarily finished at a reasonable roughness and then is subjected to the cold rolling with a high rolling reduction rate to make the surfaces flat and smooth.

On the other hand, in purifying the surfaces of the metal foil 20B and the metal substrate 20A by the method for producing clad material according to the present invention, no new irregularities or indentations are formed on the surfaces of the metal foil 20B and the metal substrate 20A. Then, the metal foil 20B and the metal substrate 20A can be pressure welded while keeping a surface flatness at the time of finish rolling carried out before pressure welding. Accordingly, even with a small pressure, a sufficient contact area is obtained and a metallic bonding steadily takes place on the contact portions so that a strong adhering strength is obtained even with the small rolling reduction rate.

Considering a case that the plate is subjected to a cold rolling and a finishing rolling or to a refining rolling in one rolling step, the upper limit of the rolling reduction rate is determined to be 30%. It is not desirable that the rolling reduction rate exceeds 30% since such rolling rate gives rise to an extremely high work hardness. For pressure welding the metal foil 20B and the metal substrate 20A in a cold rolling, in place of rolling roll, a pressurizing mechanism such as a press which is provided with a flat block at one side thereof or flat blocks at both sides thereof can be used.

The present invention is further explained in conjunction with following preferred examples.

EXAMPLE 1

A multiplicity of circular perforated openings having a diameter of 3 mm were formed on the cold rolled steel plate (metal plate) having a thickness of 90 $\mu$m in a lattice pattern by means of a punching press, wherein a pitch between openings was determined to be 10 mm. A nickel plating having a thickness of 2 $\mu$m was applied to both surfaces of the perforated steel plate by means of a Watt bath to produce a metal substrate.

This metal substrate and an aluminum foil having a thickness of 30 $\mu$m were inserted into a vacuum chamber of an argon gas atmosphere having a vacuum level of $5 \times 10^{-3}$ Torr so as to provide an etching of approximately 100 angstrom on one surface of the metal substrate and an etching of approximately 2000 angstrom on the corresponding one surface of the aluminum foil by the magnetron sputtering method. Subsequently, the metal substrate and the aluminum foil were laminated in a manner that the etched surfaces of them are contacting each other and pressure welded by a cold rolling at a temperature of 120° C. and with a rolling reduction rate of 3% to produce a clad material. A multiplicity of safety valve chips for battery use were punched from the clad material, wherein each safety valve chip was of a rectangular shape having a longitudinal length of 10.5 mm and a lateral length of 7.5 mm and was provided with one circular opening at the center thereof.

Each safety valve chip for battery use was welded to a steel-plate-made pressure vessel in such a manner that the safety valve chip hermetically closed a perforated opening formed in the pressure vessel, wherein the pressure vessel was provided with one end through which a compressed air is supplied to the pressure vessel so as to pressurize the inside of the pressure vessel.

Then, a edge part of the steel-plate-made pressure vessel was connected with an air compressor by way of a pressure gauge and the inside of the pressure vessel was pressurized. When the inner pressure of the pressure vessel reached 14 kgf/cm², the aluminum foil of the safety valve chip for battery use ruptured.

Thereafter, several safety valve chips for battery use were hermetically welded to the steel-plate-made pressure vessels and the inner pressure of the pressure vessels was increased. The aluminum foils of all sefety valve chips for battery use ruptured at pressures which fall in a stable pressure range of 12 to 18 kgf/cm².

EXAMPLE 2

A multiplicity of circular perforated openings having a diameter of 3 mm were formed in a cold-rolled stainless steel plate having a thickness of 60 $\mu$m in a lattice pattern by means of a punching press, wherein a pitch between openings was determined to be 10.5 mm. This perforated cold-rolled stainless steel plate and a nickel foil having a thickness of 10 $\mu$m were inserted into a vacuum chamber of an argon gas atmosphere having a vacuum level of $1 \times 10^{-2}$ Torr so as to provide an etching of approximately 500 angstrom on one surface of the cold-rolled perforated stainless steel plate and an etching of approximately 500 angstrom on the corresponding one surface of the nickel foil by the magnetron sputtering method. Subsequently, the etched surfaces of the the cold-rolled and perforated stainless steel plate and the nickel foil were laminated and both plate and foil were pressure welded by a cold rolling at a room temperature and with a rolling reduction rate of 0.5% to produce a clad material. Seven safety valve chips for battery use were punched from the clad material, wherein each safety valve chip was of a rectangular shape having a longitudinal length of 10.5 mm and a lateral length of 7.5 mm and was provided with one circular opening at the center thereof.

These safety valve chips for battery use were hermetically welded to a steel-plate-made pressure vessels in the same manner as that of the example 1. and as a result, the nickel foils of seven safety valve chips for battery use ruptured at pressures which fall in a stable pressure range of 13 to 17 kgf/cm².

EXAMPLE 3

A multiplicity of circular perforated openings having a diameter of 3 mm were formed on a cold rolled steel plate (metal plate) having a thickness of 90 $\mu$m in a zigzaging pattern by means of a punching press, wherein a pitch between openings was determined to be 10.5 mm. A nickel plating having a thickness of 2 $\mu$m was applied to both surfaces of the cold rolled steel plate in the same manner as that of the example 1.

This nickel-plated and perforated steel plate and a copper foil having a thickness of 10 $\mu$m were inserted into a vacuum chamber of an argon gas atmosphere having a vacuum level of $2 \times 10^{-1}$ Torr so as to provide an etching of approximately 500 angstrom on one surface of the nickel plated steel plate and an etching of approximately 500 angstrom on the corresponding one surface of the copper foil by the magnetron sputtering method. Subsequently, the etched surfaces of the nickel plated steel plate and the copper foil were laminated and pressure welded by a cold rolling at a room temperature and with a rolling reduction rate of 0.3% to produce a clad material. Seven safety valve chips for battery use were punched from the clad material, wherein each valve element was of a circular shape having a diameter of 10.5 mm and was provided with one circular opening at the center thereof.

These safety valve chips for battery use were hermetically welded to a steel-plate-made pressure vessels in the same manner as that of the example 1. Then, the inside of pressure vessel was pressurized in the same manner as that of the example 1, as a result the copper foils of these safety valve chips ruptured in a stable pressure range of 10 to 15 kgf/cm². (control—heating pressure welding under high temperature)

In a nickel-plated steel plate which was produced in the same manner as that of the example 3, a multiplicity of circular openings were formed in a zigzaging pattern in the same manner as that of the example 3. This nickel-plated steel plate and a copper foil similar to that of the the example 3 were laminated and heat sealed under pressure in a vacuum furnace at a temperature of 1000° C., seven safety valve chips each having a circular dent at the center thereof were produced from this laminated plate. After hermetically welding these safety valve chips to the pressure vessel, the inside of the steel-made pressure vessel was pressurized, and as a result the nickel foils of these safety valve chips ruptured in a wide pressure range of 4 to 12 kgf/cm$^2$.

As has been described heretofore, the clad material according to the present invention can be effectively used for producing safety valve chips which rupture accurately at low pressures which fall in a stable pressure range on a mass production basis.

What is claimed is:

1. Clad material comprising a metal substrate provided with a multiplicity of perforated openings therein and a metal foil laminated on said metal substrate so as to close said perforated openings.

2. Clad material according to claim 1, wherein at least one surface of said metal substrate and corresponding one surface of said metal foil are respectively subjected to a dry etching to provide etched surfaces and said metal substrate and said metal foil are laminated in a manner that said etched surfaces face each other.

3. Clad material according to claim 1, wherein one surface of said metal substrate is subjected to a dry etching and said metal substrate and said metal foil are laminated in a manner that said etched surface faces said metal foil.

4. Clad material according to claim 1, wherein said metal substrate or said metal foil is provided with a nickel plating.

5. Clad material according to claim 2, wherein said metal substrate or said metal foil is provided with a nickel plating.

6. Clad material according to claim 3, wherein said metal substrate or said metal foil is provided with a nickel plating.

* * * * *